(No Model.)
2 Sheets—Sheet 1.
P. G. CLANCY.
VEHICLE SPRING.
No. 289,981. Patented Dec. 11, 1883.
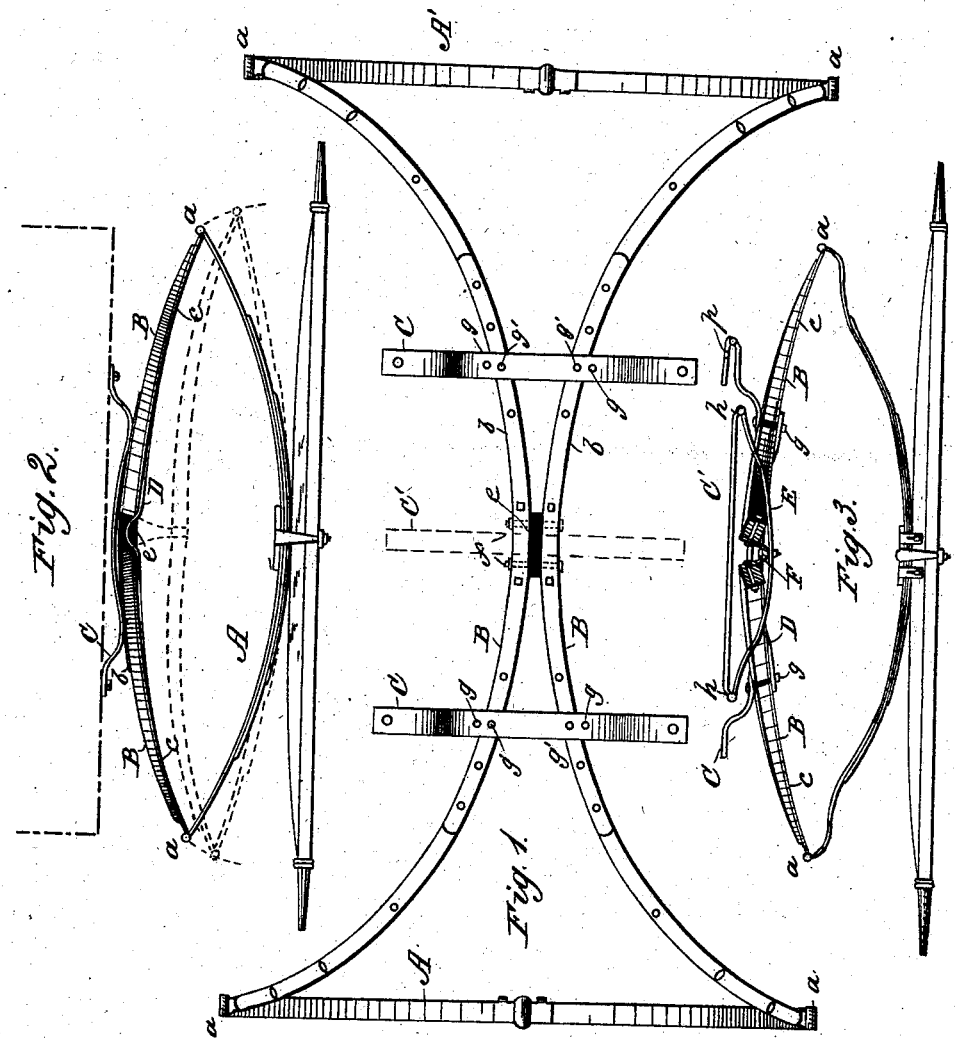
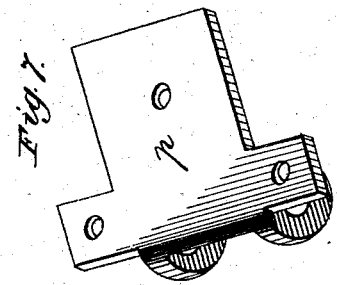
WITNESSES:
H. B. Brown
Edw. U. Byrn
INVENTOR:
P. G. Clancy
BY Munn & Co.
ATTORNEYS.

(No Model.)  2 Sheets—Sheet 2.
P. G. CLANCY.
VEHICLE SPRING.
No. 289,981. Patented Dec. 11, 1883.
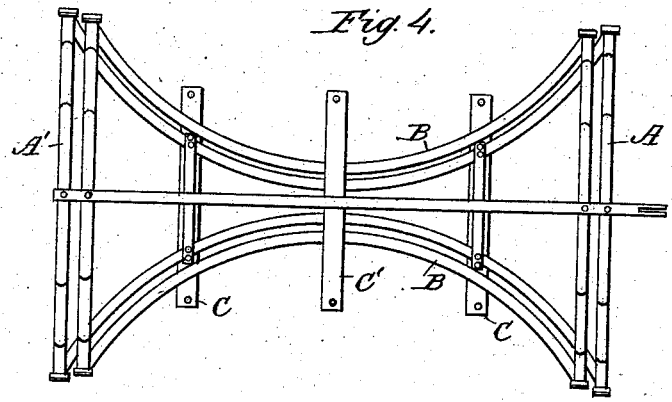
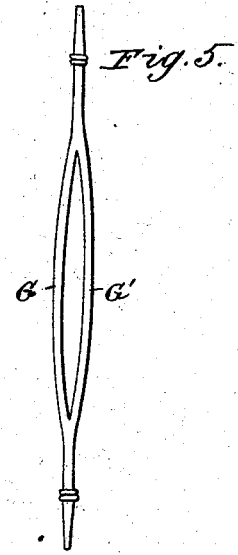
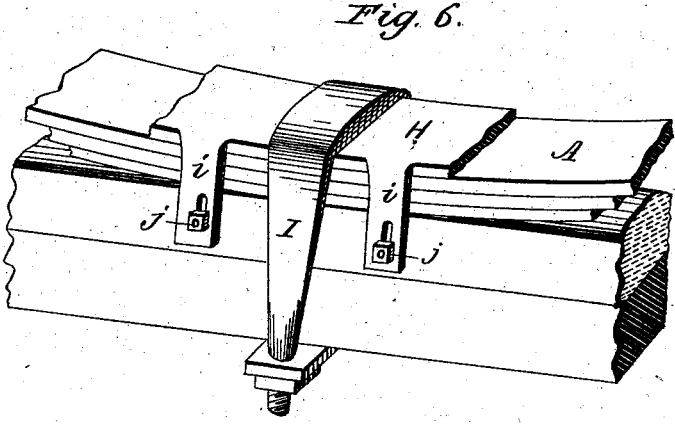
WITNESSES:
INVENTOR:

UNITED STATES PATENT OFFICE.

PATRICK G. CLANCY, OF LEXINGTON, MISSISSIPPI.

VEHICLE-SPRING.

SPECIFICATION forming part of Letters Patent No. 289,981, dated December 11, 1883.

Application filed June 11, 1883. (No model.)

*To all whom it may concern:*

Be it known that I, PATRICK GALVIN CLANCY, of Lexington, in the county of Holmes and State of Mississippi, have invented a new and useful Improvement in Vehicle-Springs; and I do hereby declare that the following is a full, clear, and exact description of the same, reference being had to the accompanying drawings, forming part of this specification, in which—

Figure 1 is a plan view of the springs or body-support which is placed between the axles and the vehicle-body. Fig. 2 is an end view of the same, showing one of the axles and also the position of the body in broken lines. Fig. 3 is a vertical cross-section through the middle, showing a modification. Fig. 4 is an inverted plan of a duplicate arrangement of the springs. Fig. 5 is a detail of the form of axle used in connection with Fig. 4. Fig. 6 is an enlarged detail, showing means for coupling the end springs to the axle. Fig. 7 is a detail of the plate to be attached to the bottom of the vehicle-body for connecting with the system of springs.

My invention relates to springs for sustaining the body of a wagon, carriage, or any other form of vehicle, which I call the "arco-equilibrating" spring, and it is designed with a view to securing great strength and elasticity, and to prevent the forward and backward pitching of the body and the rolling from side to side, and preserving only a free and easy perpendicular rebound.

In consists, mainly, in the peculiar construction and arrangement of a pair of semi-elliptical spring-bars, which are coupled at their middle by means of a spring and at their ends are supported upon end springs above the axle, and form an intermediate support between said end springs and the wagon-body, the said spring-bars having a peculiar coactive effect with the end springs in preventing the side and forward and back motion, and securing a perpendicular rebound, as will be fully described hereinafter.

In the drawings, A A' represent the two end springs, which are strongly fastened by means of clips and bolts to the front and rear axles immediately above the same.

B B are the semi-elliptical spring-bars, which curve inwardly toward each other at the middle and outwardly at their ends, and extend from the front end spring, A, to the rear end spring, A'. These spring-bars are connected to the ends of the end springs, A A', by articulated joints a, to take up motion between them at these points and prevent creaking. These spring-bars, as shown, are jointed above the ends of the end springs; but I may joint them on the sides or underneath, according to the height at which the body is to be hung. Said spring-bars may be made of metal; but for lightness they are preferably made of wood bent to shape, and when made of wood they are provided with a re-enforcing top plate or strip of metal, b, and underneath plates c, which plates are bolted through the said bars, and serve to hold them to the bend or set first given them.

At the point where the two spring-bars approach each other in the middle a spring, e, of rubber or metal, is inserted, and the two bars are loosely connected at this point by bolts f, and said bars are made to abut against each other through said spring, so that the thrust of one in moving up and down coacts with the thrust of the other with a combined effect to impart strength and stiffness against all horizontal motion, and the bars are made to rock or turn against each other in the middle, giving a free and easy perpendicular rebound. These spring-bars are a little nearer a straight line in the center, and at their ends bend more quickly or abruptly, so that the thrust of these bars in going down does not have a tendency to twist the end springs, but is exerted in line with the end springs or in lateral direction, the ends of the spring-bars expanding as they move down in unison with the widening or expansion of the end springs.

C C are two cross-bars, of metal or wood, which rest upon the two curved spring-bars at points between the rubber spring and the end springs, and form a support upon which is carried the body of the carriage or wagon, the same being bolted or clipped to said cross-bars.

For connecting the cross-bars C to the spring-bars bolts g pass through the same and also through curved plates D on the under side of said bars.

At each connection of the cross-bars C to the spring-bars two bolts or clips, g g', are used, one of which passes through the spring-bar and the other outside of it. This makes a very strong connection, and also permits the cross-bars to be set closer to the end springs by changing the said bolts or clips.

The cross-bars C and underneath plates D are made with a certain degree of spring to them to accommodate the expansion and contraction of the side spring-bars in their up and down movement, and for this purpose a curve is given to the bars C and D, as shown in Fig. 2, the largest curve being given to the lower plate, D, because this, being on the under side, has to expand more when the spring-bars B descend than the upper cross-bars, C, do. If desired, the upper cross-bars, C, may be made with two or more leaves for greater strength, or there may be simply a re-enforce plate at the point where the bolts $g$ pass through.

Now, in the arrangement of the semi-elliptical spring-bars B B it will be seen that they have an upward arch as well as a horizontal curve, and their action, when they are forced down by the weight on the wagon-body or carriage, is as follows: The ends of the end springs are flattened out and move downwardly and slightly outwardly, the thrust of the spring-bars B being on the line of the length of the springs, so that no torsional effect is brought on the end springs or axle, and at the same time the middle of the curved spring-bars mash together and rock or roll against each other, compressing the spring between, as shown in dotted lines in Fig. 2. Then, as the body rises, the reverse motion takes place, making an easy perpendicular motion without the usual forward or backward motion or lateral pitching.

A great feature of merit of this construction is the combined effect or unison of action and equalization of strain, whereby breakage is rendered impossible with any ordinary or even extraordinary usage, and weight in any part of the body is evenly distributed, or nearly so, to all parts of the body-support, thus avoiding careening of the vehicle. By setting the cross-bars C nearer the ends of the spring-bars the system of springs is made stiffer, and vice versa.

In making use of my invention I may, for stronger vehicles carrying heavier loads, use an additional cross-bar, C', in the middle of the spring-bars, which is shown in dotted lines in Fig. 1 and full lines in Fig. 3, and is connected by articulated joints $h$ to the ends of a spring-stirrup, E, and upon this stirrup is fastened a thin U-shaped spring-plate, F, one of whose branches is bolted to the middle of one of the spring-bars, B, and the other of whose branches is bolted to the other of said spring-bars. This spring-stirrup plate E and U-shaped plate F, while holding the middle portion of the spring-bars, allow the latter to descend and rock toward each other freely as before, but make a stronger connection of the parts to each other and to the wagon-body.

If desired, the U-shaped plate may have a rubber spring between its branches. I also, in some cases when a strong body-support is required, double the end springs, A, and the curved side springs, B, as shown in Fig. 4, and the axle is in such case made either with two branches, G G', in the middle, as in Fig. 5, to receive the double end springs, or else the axle has two offsets or seats for this purpose.

When I use duplicate end springs side by side in connection with duplicate side spring-bars, I may make both the end springs of each pair of the same or different lengths, and connected together by a common coupling at their ends, or separate, as shown, and the curved side spring-bars I may also make of the same or different lengths, and connected together or separate. The double axle referred to by me is double in horizontal direction only, and this serves not only the useful purpose of receiving the duplicate end springs, but braces the axle against wrenching strains in going down hill, &c., which has a tendency to bend the axle horizontally and destroy the set of the same.

In connecting the cross-bars C and C' to the bottom of the wagon-body I may, instead of bolting them direct, form an articulated coupling at the ends of said cross-bars, which are jointed to plates $p$, Figs. 3 and 7, on the bottom of the wagon or carriage.

In connecting the end springs, A A', to the axles, I use an extra plate, H, Fig. 6, which fits upon the top of the spring, and has upon each side two legs, $i\ i$, which extend down beside the axle, and are slotted and bolted to the wooden section of the axle by bolts $j\ j$, the slots adapting the plate to be raised or lowered to accommodate different thicknesses of spring. Over this plate, and upon both sides of the spring and axle, there passes a clip or saddle plate, I, of the ordinary construction, which has underneath the axle a plate secured by nuts, and which, when tightly secured, holds the springs firmly to the axle. The object of this plate H is to hold the springs against turning about their vertical center, and still avoid clamping the springs, except at one point, and that in the middle, thus securing the advantage of greater flexibility of spring than would be obtained if the spring were secured at two points on opposite sides of its center by tightly-clamped clip-plates.

In adapting my invention to two-wheeled vehicles, the end springs, A A', may be set at right angles upon the single axle, and the shafts then connected to the two ends of one of the curved side-bars, B.

Having thus described my invention, what I claim as new is—

1. The combination, with the two end springs, A A', of the semi-elliptical spring-bars B B, having their ends jointed to the ends of the end springs, a spring-connection interposed between the middle of the spring-bars, and cross-bars C C, fixed to the spring-bars between the spring-connection and the ends of said bars, whereby the spring-bars find an abutment against each other and rock upon said spring-connection, as described.

2. The combination, with the two inwardly-curved semi-elliptical spring-bars B B and the cross-bars C C, of the additional cross-bar C', spring-stirrup E, and U-shaped spring-plate F, having its branches connected, respectively, to the two spring-bars, as described.

3. The combination, with the two semi-elliptical spring-bars B B, having a rocking abutment against each other, of the cross-bars C C, connected to each spring-bar by sets of bolts or clips $g$ $g$, and made adjustable to or from the ends of the spring-bars, as described.

4. The combination, with the duplicate end springs, A A', of the duplicate spring-bars B B, and the axles having duplicate seats for the duplicate end springs, as and for the purpose set forth.

5. The plate H, having slotted legs, in combination with the spring A, the axle, the clip I, and the bolts $j$, securing the said legs to the axle, as described.

P. G. CLANCY.

Witnesses:
CHAS. A. PETTIT,
SOLON C. KEMON.